(12) United States Patent
Boiteau

(10) Patent No.: US 6,972,062 B2
(45) Date of Patent: Dec. 6, 2005

(54) PROCESS FOR THE MANUFACTURE OF A TIRE

(75) Inventor: Alain Boiteau, Chateaugay (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 222 days.

(21) Appl. No.: 10/325,574

(22) Filed: Dec. 20, 2002

(65) Prior Publication Data

US 2003/0136499 A1    Jul. 24, 2003

(30) Foreign Application Priority Data

Dec. 28, 2001  (FR) .................................. 01 17134

(51) Int. Cl.[7] .......................... B29D 30/32; B29D 30/38
(52) U.S. Cl. ...................... 156/131; 156/132; 156/133; 156/134
(58) Field of Search ...................... 156/130.7, 131–135, 156/406.4, 421.4, 304.3, 304.4; 152/552

(56) References Cited

U.S. PATENT DOCUMENTS

| | | | |
|---|---|---|---|
| 1,770,895 A | 7/1930 | Abbott, Jr. | |
| 1,933,692 A | 11/1933 | Abbott, Jr. | |
| 2,754,887 A | 7/1956 | Wykoff | |
| 3,038,827 A | 6/1962 | Wilhelm | |
| 3,534,953 A | 10/1970 | Appleby | |
| 3,625,271 A * | 12/1971 | Hutch | 152/540 |
| 4,256,522 A | 3/1981 | Britton | |
| 4,280,547 A * | 7/1981 | Gilmore | 152/528 |
| 5,062,462 A | 11/1991 | Rye et al. | |
| 6,109,322 A | 8/2000 | Benzing, II et al. | |
| 6,533,891 B1 * | 3/2003 | Kubinski | 156/304.3 |

FOREIGN PATENT DOCUMENTS

| | | | | |
|---|---|---|---|---|
| EP | 120623 A2 * | 10/1984 | | 156/134 |
| EP | 1 108 526 A | 6/2001 | | |
| FR | 977 916 A | 4/1951 | | |

OTHER PUBLICATIONS

European Search Report—EP02/027,745, prepared Apr. 10, 2003.

* cited by examiner

Primary Examiner—Geoffrey L. Knable
(74) Attorney, Agent, or Firm—E. Martin Remick; Adam Arnold

(57) ABSTRACT

The invention concerns a process for the manufacture of a tire comprising the following steps: a) laying a carcass reinforcement on a generally flat receiving surface; b) turning up at least one lateral end of the carcass reinforcement over itself to obtain a semi-finished product having a turnup; c) laying a complete turn of the semi-finished product so obtained in the circumferential direction around a generally cylindrical receiving surface; d) joining together the opposing ends of the semi-finished product to obtain a joint; and e) positioning a bead wire over the turnup so formed.

8 Claims, 4 Drawing Sheets

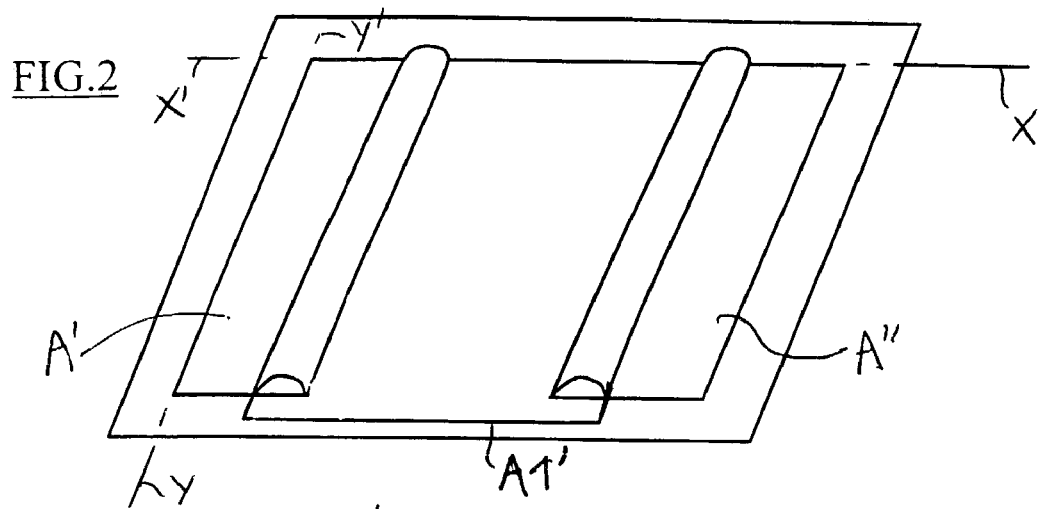
FIG.2
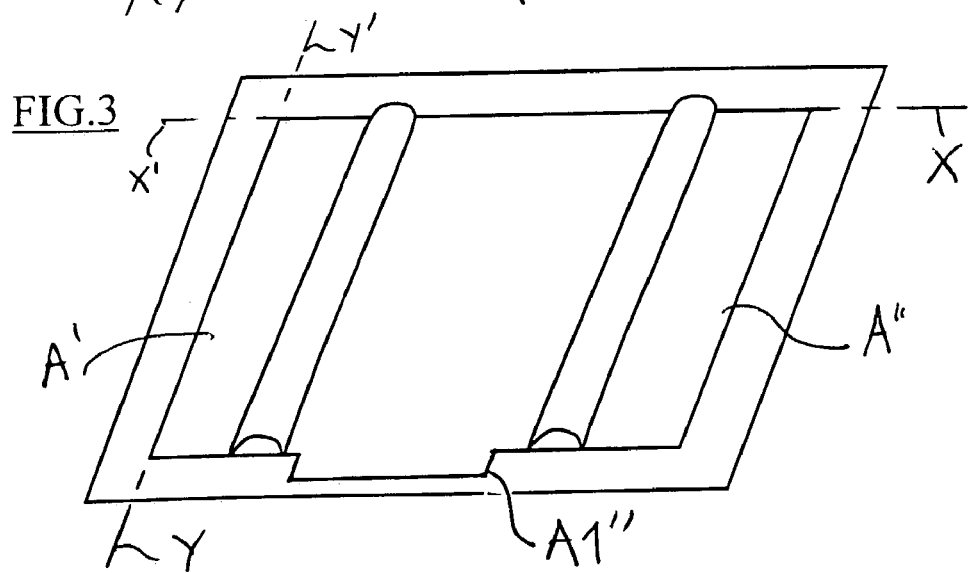
FIG.3
FIG.4
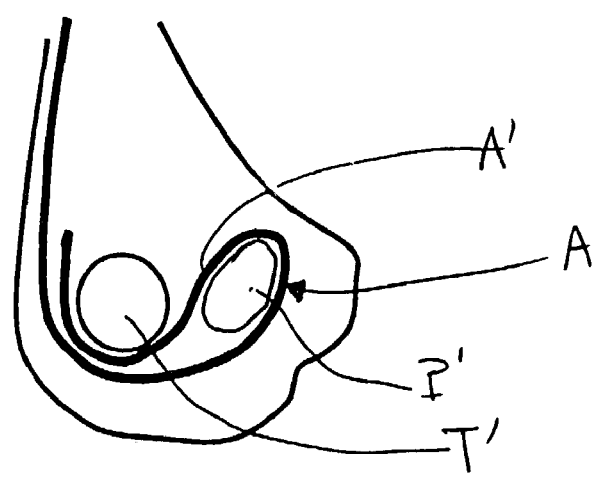

PROCESS FOR THE MANUFACTURE OF A TIRE

CROSS-REFERENCE TO RELATED APPLICATIONS

This application claims the benefit of French Application No.: 01/17134, filed Dec. 28, 2001.

TECHNICAL FIELD

The present invention concerns a process for the manufacture of tires.

BACKGROUND

The invention concerns the manufacture of a tire comprising a carcass reinforcement with at least one reinforcing bead wire in each of the tire beads around which the carcass reinforcement is wrapped to form a turnup. In contrast to general practice, the tire has a turnup of the carcass reinforcement that is arranged between the bead wire and the carcass reinforcement itself. For a fuller understanding of the tire, reference can be made in particular to patent application FR-2 716 645 (FIG. 2).

There are several categories of processes for the manufacture of tires: some make use of several building drums used in succession, others use building drums having a receiving surface whose central portion is cylindrical and whose ends have shoulders, while yet others use a collar to obtain a semi-finished cylindrical product commonly known as a "pocket" prior to the use of a building drum. Whatever the process chosen, the operation of turning up the carcass reinforcement around the bead wires, if indeed it is desired to do so, takes place only after the carcass reinforcement has been positioned on a building drum.

Such a turnup is produced employing devices for turning up the carcass reinforcement that may or may not be fixed on the building drum. As an example, mention can be made of the U.S. Pat. No. 3,698,987 which describes a turning up device comprising a first inflatable bladder having the general appearance of a torus, and whose displacement required to bring about the turning up operation takes place thanks to an intermediate element consisting of a second inflatable bladder or a metallic collar which pushes the first bladder transversely. In U.S. Pat. No. 4,087,306, the turning up device consists of a turning up bladder which, solely under the effect of the inflation pressure, develops by itself the rolling movement in the transverse direction required to bring about the turning up of the carcass reinforcement.

These drums and turning up devices enable the manufacture of tires by implementing a process step which occurs after the carcass reinforcement has been positioned on the uninflated drum (i.e. when its circumferential dimension is smallest and the bead wires are axially positioned opposite to their position of fixation relative to the carcass). This step consists of inflating the drum in order to fix the position of the bead wires on the carcass reinforcement and then actuating the turning up device which enables each lateral end of the carcass reinforcement to be turned up around the corresponding bead wire.

Such drums are not suitable for a modification of the manufacturing process in which the turnup of the carcass reinforcement is positioned under the bead wire. Where the operation of the turning up device depends on the presence of a fixed point, consisting of the bead wire, around which the carcass reinforcement is turned up, there is no apparent way in which the carcass reinforcement can be turned up using the bead wire to determine the fold position, while at the same time threading the turnup radially underneath the bead wire.

Certain specific drums such as the one described in the publication FR-2 777 827 or else in the publication EP 0 953 435, comprise turning up devices that consist of fingers which extend radially and can be radially displaced so as to leave free the ends of a carcass reinforcement whose turnup can then be produced by the bead wires themselves, moved by a guide that can be displaced radially. Such a drum requires considerable and complex mechanisms for the production of the turnup.

SUMMARY OF THE INVENTION

Therefore, an object of the invention is a simple process for the manufacture of tires which, in particular, enables the production of tires in which the turnup of the carcass reinforcement can be positioned between the bead wires and the carcass reinforcement.

According to the invention, the process for manufacturing tires comprises the following steps:
- laying a carcass reinforcement on a generally flat receiving surface,
- turning up at least one lateral end of the carcass reinforcement over itself to obtain a semi-finished product having a turnup,
- laying a complete turn of the semi-finished product so obtained in the circumferential direction around a generally cylindrical receiving surface,
- joining together the opposing ends of the semi-finished product to obtain a joint, and
- positioning a bead wire over the turnup so formed.

The invention also concerns a process in which the step of placing the semi-finished product in the circumferential direction on a generally cylindrical surface around which it makes a complete turn, is preceded by the following steps:
- laying a portion of a continuous carcass ply on a generally flat receiving surface,
- turning up at least one end of this portion of a continuous ply over itself to obtain a semi-finished product having a turnup, and
- cutting to length the semi-finished product so obtained.

The advantage of the invention is that the operation of turning up the ply over itself can be advantageously carried out before the step of laying the resultant semi-finished product on a generally cylindrical receiving surface.

Separating these steps allows the turnup to be easily positioned between the bead wire and the carcass reinforcement.

BRIEF DESCRIPTION OF THE DRAWINGS

Other advantages and characteristics of the invention will emerge on reading the description of an example of the use of the process according to the invention, with references to the drawings wherein:

FIG. 2 is a schematic perspective representation of the semi-finished product used in the production of a tire as shown in FIG. 1B according to one variant, FIG. 3 is a schematic perspective representation of the semi-finished product used in the production of a tire as shown in FIG. 1B according to a second variant, FIG. 4 is a schematic partial radial cross-section of a bead of a first type of tire that can be made using the process according to the invention.

DETAILED DESCRIPTION

According to FIGS. 1A to 1F the process according to the invention comprises the following steps.

Figure 1A:
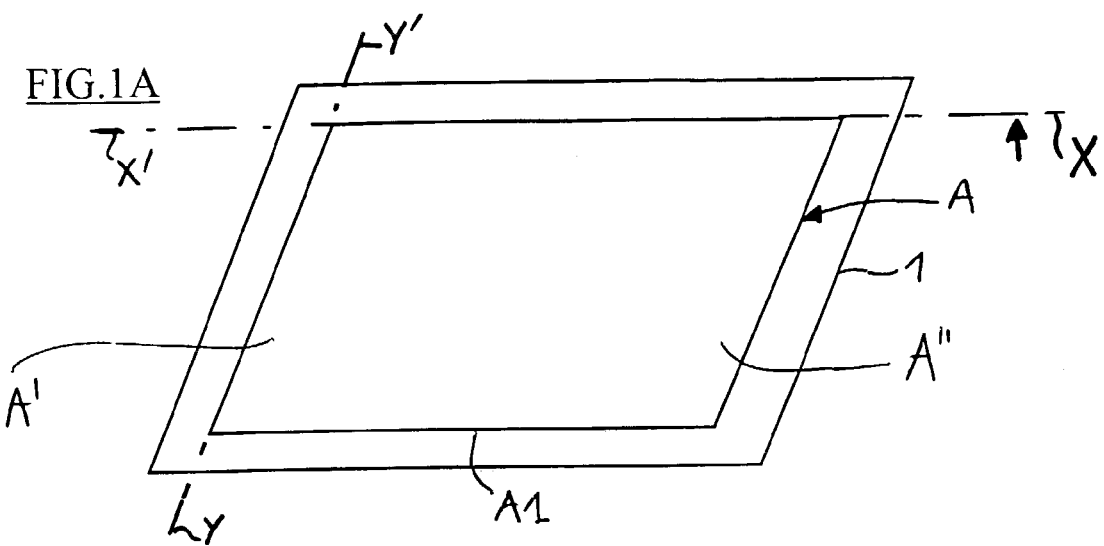
FIGS. 1A to 1F are schematic perspective illustrations of the steps of the process.
Figure 6:
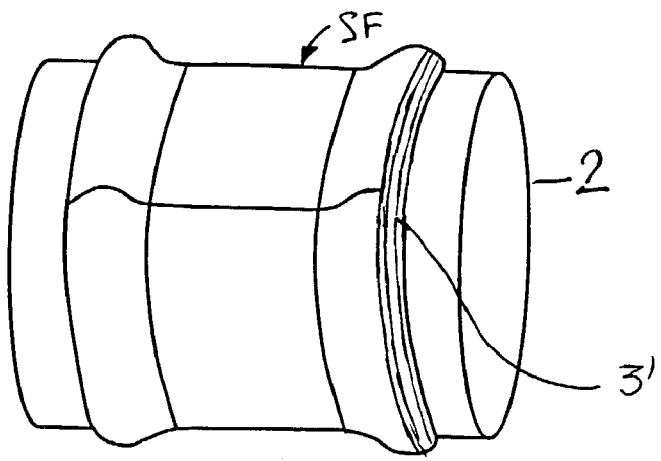
FIG. 6 is a schematic perspective representation of the process step illustrated in FIG. 1D according to a second variant of the process according to the invention.
Figure 7:
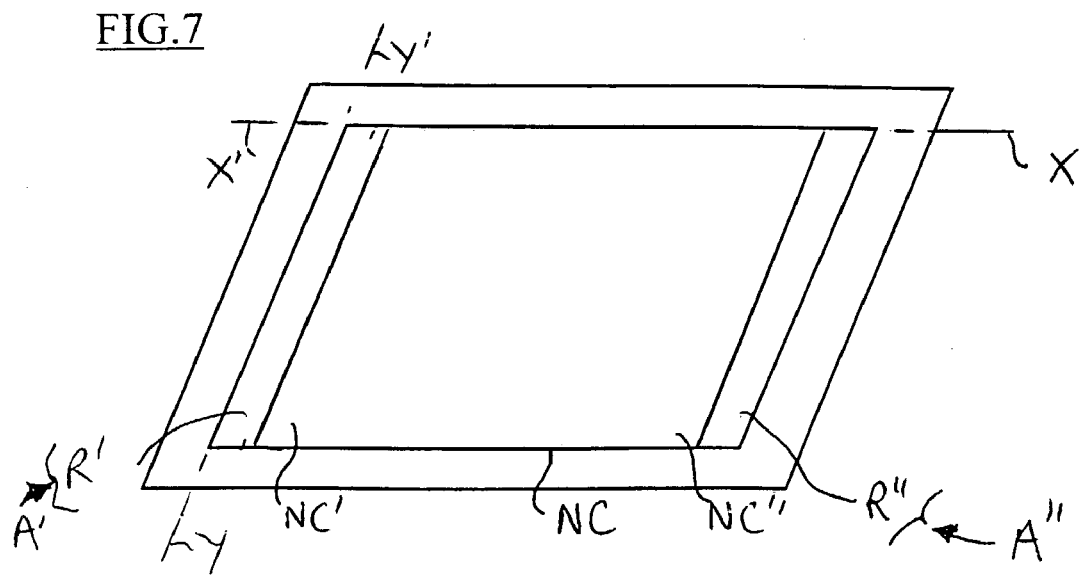
FIG. 7 is a schematic perspective representation of the process step illustrated in FIG. 1A according to a variant of the process according to the invention.

A ply of textile cables is placed onto a generally flat surface 1 such as the surface of a receiving table. In the example described here, the ply constitutes on its own the carcass reinforcement A, as shown in FIG. 1A. The perpendicular axes in the flat surface 1, are indexed X'X and Y'Y to facilitate the referencing of positions in FIGS. 1A to 1C and in FIGS. 5 to 7. As shown in FIG. 7, the specific carcass reinforcement can consist of a ply of cables NC whose two lateral opposite ends NC' and NC" in the direction X'X have longitudinal sections R' and R" of rubber mixtures (or strips of rubber mixtures comprising cables) arranged under the ply in relation to the position of the ply on the table 1, such that the sections R' and R" extend beyond the ply in the direction X'X along each of the said ends of the ply. In what follows, "lateral opposite ends A' and A" in the X'X direction" means the ends of the carcass reinforcement A, whether these consist of the ends of the ply itself or are set back relative to the ply.

Note that in the figures, the carcass reinforcement has edges parallel to the directions X'X and Y'Y, but the invention is of course not limited to such examples, since the carcass reinforcement could be cut at an angle.

Figure 1B:
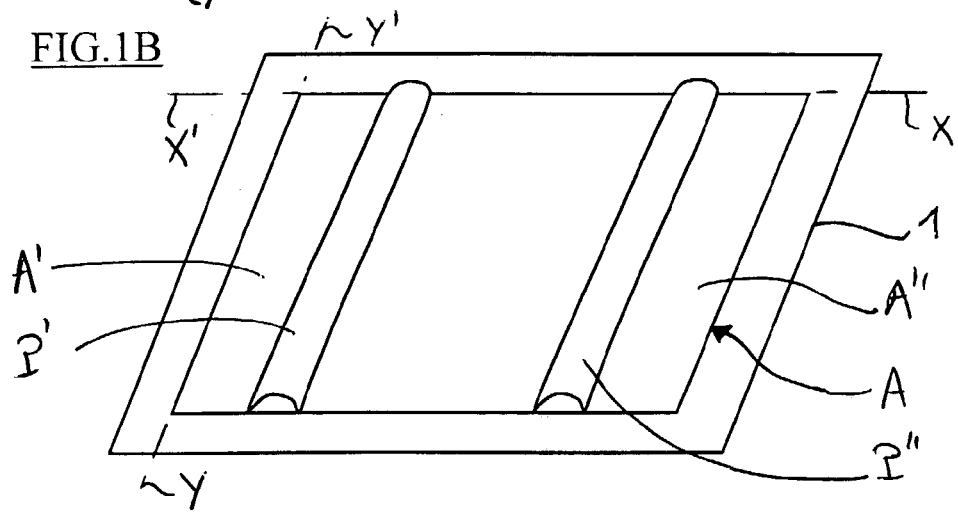

Depending on the type of tire to be produced, two profiled rubber sections P' and P" are then placed respectively over the zones of the lateral opposite ends A' and A" of the carcass reinforcement A, as shown in FIG. 1B. In the figures these sections are shown as having a semicircular cross-section, but other section shapes can clearly be envisioned.

In particular, the presence of these sections P' and P" allows a tire to be produced, which comprises a carcass reinforcement and two beads, each containing at least one reinforcing bead wire, and wherein the carcass reinforcement forms a turnup arranged between the bead wire and the carcass reinforcement itself. One of these beads is illustrated schematically in FIG. 4. This example, however, should not be taken to limit the scope of the invention to the production of the type of tire described above.

Figure 1C:
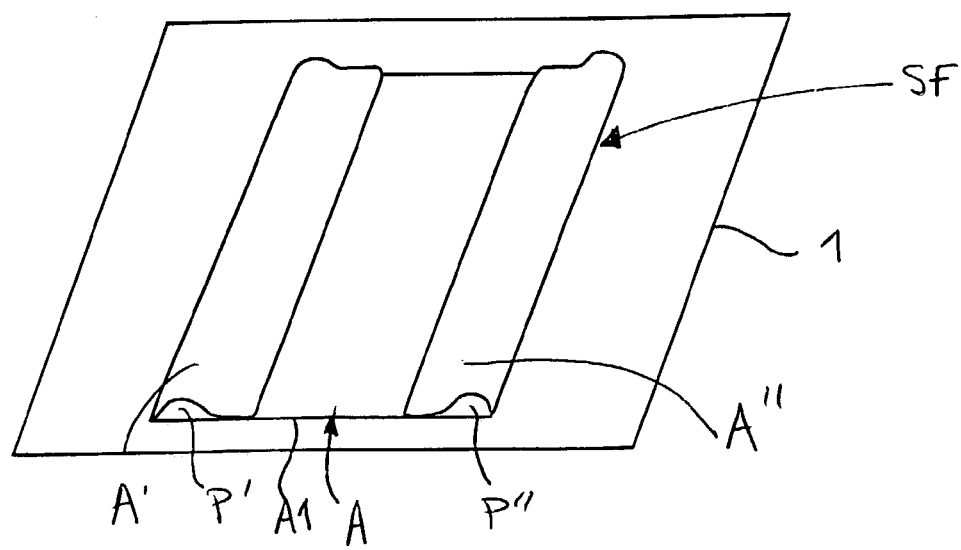

Note in particular that one can proceed directly to the process step wherein the ply ends are turned up, as shown in FIG. 1C, to produce different tire structures. This process also allows other types of tires to be made, in particular tires in which the two beads of the same tire have different diameters.

The ply ends A' and A" are then turned up over themselves or around the sections P' and P", as shown in FIG. 1C. The turnup can be made in any way, such as by means of a turning up device (turning up membranes, fingers, etc.), which can be present on the table itself or brought to it. It can be advantageous to provide a means for maintaining the position of the zone of the carcass reinforcement close to the end to be turned up, which should remain flat even when no sections are present. There may be only a single turnup step, but one can also consider several successive turnups of the end of the carcass reinforcement, especially in order to obtain a particular structure. In effect, the process offers numerous possibilities for the turnups and permits products to be added to the carcass reinforcement before the bead wires are put in place. At this stage a semi-finished product is produced, to which of course other products can be added, such as products made of rubber mixtures or reinforcements comprising cords embedded in a ply of rubber mixtures, before transfer onto a building drum.

Figure 1D:
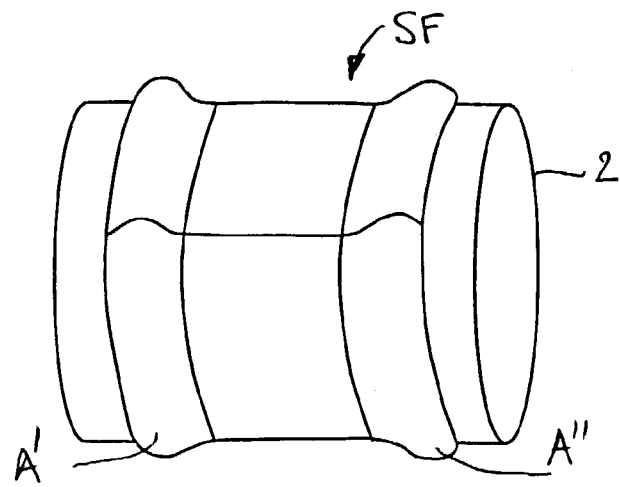

In the example shown in FIG. 1C the lateral opposite edges A1 and A2 in the direction Y'Y of the carcass reinforcement and adjacent to the turned up ends A' and A", are aligned with the turnups. However, it can be envisioned, as shown in FIG. 2, that the carcass reinforcement has cutouts at the corners of one of its edges A1. In such an example, the exterior edge A1 extends beyond the center of the carcass reinforcement in the direction Y'Y relative to the turnups of the ends A' and A". FIG. 3 shows an example where the size of the cutouts may be larger than shown in FIG. 2, such that the length of the edge A1 is smaller than that of the carcass reinforcement in its central portion. As will be seen in more detail below, these variants of the form of the edge A1 of the carcass reinforcement modify the zone where the carcass reinforcement joins to itself, This semi-finished product, denoted SF, is then placed on a generally cylindrical surface 2 such as that of a building drum, as shown in FIG. 1D. It could be considered to position the product SF reversed, i.e. with the turnups in contact with the surface 2. To carry out the operation of transferring the product, guide channels can be provided, which are mounted directly at the outlet of the receiving table and are designed to feed the building drum or to provide intermediate storage of the semi-finished products. The positioning of the semi-finished product SF on the building drum is completed by forming a joint which, in the example shown in FIG. 1D, consists of an "edge to edge" seam of the central zone of the carcass reinforcement A with turned-up ends. Note that in practice, the natural deformation of the carcass reinforcement can give rise to a slight curvature of the edge A1 when it is turned up, but nevertheless the joint is regarded as an edge to edge seam.

Figure 5:
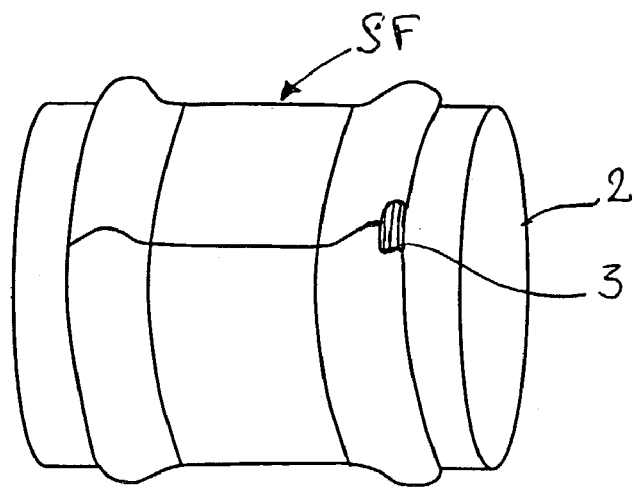
FIG. 5 is a schematic perspective representation of the process step illustrated in FIG. 1D according to a first variant of the process according to the invention.

It is clear in the variants shown in FIGS. 2 and 3 that there is an overlap along the whole length of the edge A1. The outer ends in the X' direction of the turnup zones, either with or without profiled sections, are joined edge to edge as in the previous variant. This edge to edge joint of the outer ends in the X'X direction of the turnup zones naturally tends to open. To guarantee the quality of the finished tire, it is advantageous to keep the joint closed until the tire curing phase by providing a mechanical linking element arranged over the joint, which can be temporary or, preferably, can remain in the cured tire. This mechanical linking element can be a hook made of a material compatible with the rubber mixtures or a mechanical device such as claws that ensure that the joint is maintained until the tire is placed in the mold. As shown in FIG. 5, the linking element is a small strip 3 of a rubber mixture that is adhered to the carcass cords. The strip 3 comprises textile or metallic cords parallel to one another in the longitudinal direction of the strip. In FIG. 5 the strip 3 is a short strip arranged in the circumferential direction relative to the drum on at least one of the turnups. One could also envision a strip 3' as shown in FIG. 6 arranged also arranged in the circumferential direction and extending completely around the circumference of the carcass reinforcement.

Figure 1E:
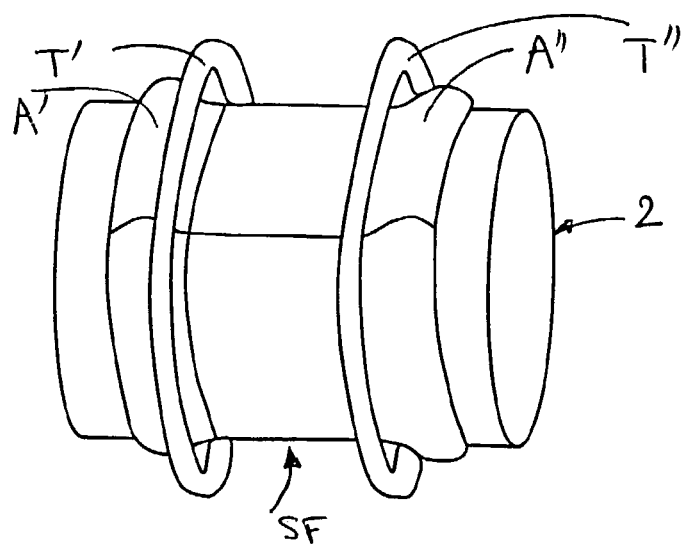
Figure 1F:
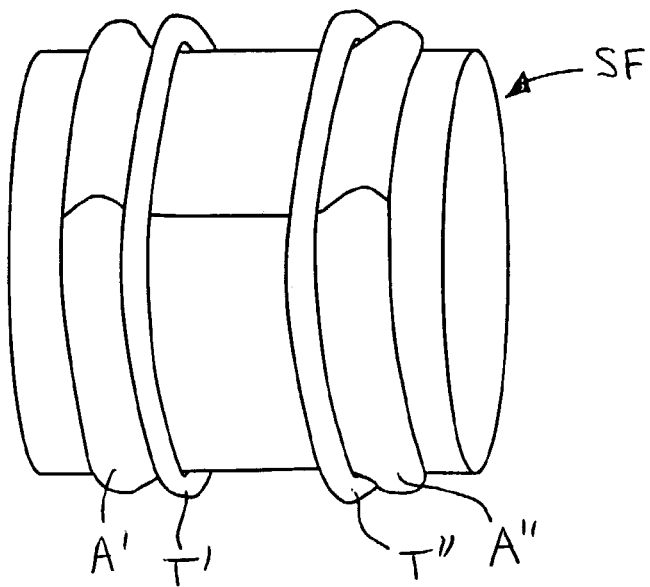

After other constituent products of the tire have been positioned as necessary, bead wires T and T' are brought in via guides (FIG. 1E). The guides carrying the bead wires T' and T'' are then advanced axially towards the carcass reinforcement A until they reach the desired position relative to the carcass reinforcement and, more precisely, relative to the turnups on the reinforcement. In this fabrication example the advance of the guides is synchronized with an expansion of the drum. Once the bead wires T' and T'' are in an axial position corresponding to the desired final position, the bead wires are then released and the drum expands as far as its fully expanded position. Thus, the positions of the bead wires are fixed both axially and radially, as shown in FIG. 1F.

The other constituent products of the tire are then put in place. Numerous methods are available to those skilled in the art, and there is, therefore, no necessity in describing this aspect of the manufacture in the context of the present invention. Finally, the tire is vulcanized. As was seen earlier, this process, which is simple to put into practice, enables a tire to be produced whose beads have diverse and complex structures.

Note that according to another variant of the process, the process can be carried out continuously starting with a continuous carcass ply wound a spool. A portion of this ply is unrolled from the spool and rests on a flat surface on which one end, or the opposed ply ends are turned up continuously. The semi-finished product so obtained is then cut to length and placed on a cylindrical surface. The process then continues in a manner identical to the variant described above.

What is claimed is:

1. A process for the manufacture of a tire, comprising the following steps:
   laying a carcass reinforcement on a generally flat receiving surface,
   positioning of at least one profiled rubber section intended to form the bead of the said tire on each lateral end of said carcass reinforcement,
   turning up each lateral end of said carcass reinforcement over itself and around said profiled rubber section to obtain a semi-finished product having a turnup,
   laying a complete turn of said semi-finished product so obtained on a generally cylindrical receiving surface,
   joining together the opposite ends of said semi-finished product to obtain a joint,
   positioning a bead wire over said turnup so formed.

2. The process according to claim 1, wherein the step of joining said semi-finished product is carried out edge to edge along the entire length of said ends of said semi-finished product.

3. The process according to claim 1, wherein the step of joining said semi-finished product is made edge to edge in that part of the end of said turnup which is located in at least one end zone towards the outside of the carcass reinforcement, and wherein the step of joining said semi-finished product is made with an overlap in a zone of the carcass reinforcement located interior to said end zone.

4. The process according to claim 1, further comprising the step of applying a linking device upon a joint of at least one turnup of said semi-finished product whereby said joint is maintained closed until the tire is vulcanized.

5. The process according to claim 4, wherein said linking device comprises at least one narrow strip having parallel cords oriented in the longitudinal direction of said strip, and said strip is adhered to said joint with said cords arranged circumferentially relative to said generally cylindrical receiving surface.

6. The process according to claim 5, wherein said narrow strip is extended around the entire circumference of said cylindrical receiving surface.

7. The process according to claim 1, wherein said lateral end is turned up several times over itself.

8. The process according to claim 1, wherein the step of laying said semi-finished product on a generally cylindrical surface is preceded by the steps of:
   laying a portion of a continuous carcass ply on a generally flat receiving surface,
   turning up at least one end of said ply portion over itself to obtain a semi-finished product having a turnup,
   cutting to length said semi-finished product so obtained.

* * * * *